United States Patent [19]

Bellamy

[11] 4,439,863
[45] Mar. 27, 1984

[54] PARTIAL RESPONSE SYSTEM WITH SIMPLIFIED DETECTION

[75] Inventor: John C. Bellamy, Dallas, Tex.

[73] Assignee: Rockwell International Corporation, El Segundo, Calif.

[21] Appl. No.: 210,951

[22] Filed: Nov. 28, 1980

[51] Int. Cl.³ .......................................... H03K 13/11
[52] U.S. Cl. ....................................... 375/18; 375/39; 340/347 DD
[58] Field of Search .................................. 375/17-20, 375/60, 83, 94, 99, 101, 39, 42, 86; 360/45; 340/347 DD

[56] References Cited

U.S. PATENT DOCUMENTS

| | | | |
|---|---|---|---|
| 3,388,330 | 6/1968 | Kretzmer | 375/18 |
| 3,508,153 | 9/1967 | Gerrish et al. | 375/18 |
| 3,706,054 | 11/1970 | Starr et al. | 375/60 |
| 4,110,691 | 8/1978 | Lender | 375/17 |
| 4,123,710 | 10/1978 | Stuart et al. | 375/18 |
| 4,140,974 | 2/1979 | Lindner | 375/94 |

FOREIGN PATENT DOCUMENTS

1444821  4/1976  United Kingdom ................ 375/101

OTHER PUBLICATIONS

A. Lender, "The Duobinary Technique for High-Speed Data Transmission," *IEEE Transactions on Communications & Electronics*, May 1963, pp. 124-128.

E. R. Kretzner, "Generalization of a Technique for Binary Data Communication," *IEEE Transactions on Communications Technology*, Feb. 1966, pp. 67-68.

C. W. Anderson and S. G. Barber, "Modulation Considerations for a 91 Mbit/s Digital Radio," *IEEE Transactions on Communications*, May 1978, pp. 523-528.

J. Alexander, R. Cheung and T. Kao, "A Four Bits/Hertz Radio at 8 GHZ" *International Conference on Communication (IEEE)*, 1979, pp. 5.7.1-5.7.5.

P. Kabal and S. Pasupathy, "Partial Response Signaling" *IEEE Transactions on Communications*, Sep. 1975, pp. 921-934.

A. M. Gerrish and R. D. Howson, "Multilevel Partial-Response Signaling," *International Conference on Communications Record (IEEE)* 1967, p. 186.

G. D. Forney, Jr., "Maximum Likelihood Sequence Estimation of Digital Sequences in the Presence of Intersymbol Interference," *IEEE Transactions on Information Theory*, May 1972, pp. 363-378.

C. R. Hogge, Jr., "Carrier and Clock Recovery for 8PSK Synchronous Demodulation", *IEEE Transactions on Communications*, Vo. Com.-26, No. 5, May 1978, pp. 528-533.

A. Lender, "Correlative Level Coding for Binary-data Transmission," *IEEE Spectrum*, Feb. 1966, pp. 104-109.

*Primary Examiner*—Robert L. Griffin
*Assistant Examiner*—Stephen Chin
*Attorney, Agent, or Firm*—Michael E. Taken; V. Lawrence Sewell; H. Fredrick Hamann

[57] ABSTRACT

A simple system is disclosed for detecting an 8 PSK (Phase Shift Keyed) - PRS (Partial Response System) signal output set, and other multi-level PSK and APSK (Amplitude and Phase Shift Keyed) - PRS signal sets. Quadrature interdependent channel decision feedback translates a reduced output signal set which is a scaled down version of the original full response input signal set before partial response filtering. The reduced output signal set has the same number of points and the same distribution array pattern as the input signal set. This enables the use of a conventional detector which need only detect the reduced signal set, not the complete output signal set. A decoder controls selection of predetermined interdependent signal value adjustments for each channel to translate the reduced output signal set in accordance with each successive signal relative to the then current signal value.

15 Claims, 22 Drawing Figures

INPUT

INPUT

OUTPUT
3 LEVEL
PRS

OUTPUT
7 LEVEL
PRS

4 PSK SIGNAL SET

2 INPUT LEVEL QAM SIGNAL SET

8 PSK SIGNAL SET

3 LEVEL QPRS SIGNAL SET

4 INPUT LEVEL QAM SIGNAL SET

7 LEVEL QPRS SIGNAL SET

8 PSK-PRS SIGNAL SET

45° PHASE ERROR

90° PHASE ERROR

135° PHASE ERROR

180° PHASE ERROR

PARTIAL RESPONSE SYSTEM WITH SIMPLIFIED DETECTION

TECHNICAL FIELD

The invention relates to partial response filtering for increasing the digital data rate in a given transmission bandwidth, and more particularly to a simplified output signal set for detection.

BACKGROUND

Partial response systems (PRS) are well-known in the art. Partial response techniques (also called duobinary or correlative level encoding) are used to increase the signaling rate in a given bandwidth, "The Duobinary Technique for High-Speed Data Transmission" by A. Lender, *IEEE Transactions on Communications and Electronics*, May 1963, pp. 214–218, and "Generalization of a Technique for Binary Data Communication," by E. R. Kretzmer, *IEEE Transactions on Communications Technology*, February 1966, pp. 67–68.

These techniques have been applied to various forms of amplitude modulation using baseband signal processing to detect the multiple levels produced by the partial response process. One application has been in two dimensional, e.g. quadrature amplitude modulated (QAM), systems where each channel is independently amplitude modulated. When two level (binary) input signaling is used on each of the two channels before partial response filtering, a three level output is generated on each channel and is commonly referred to as QPRS modulation, "Modulation Considerations for a 91 Mbit/s Digital Radio" by C. W. Anderson and S. G. Barber, *IEEE Transactions on Communications*, May 1978, pp. 523–528. When the two quadrature channels are each encoded with four input levels before filtering, a QPRS system with seven output levels on each axis results, "A Four Bits/Hertz Radio at 8 GHz" by J. Alexander, R. Cheung and T. Kao, *International Conference on Communication* (IEEE), 1979, p. 5.7.1–5.7.5. Partial response techniques have thus been applied to single dimensional AM (amplitude modulation) and to two dimensional QAM systems.

SUMMARY

The present invention relates to partial response filtering of a two dimensional signal and a simplified detection system therefor.

The invention further relates to an extension of partial response techniques to multilevel PSK (phase shift keyed) modulation, including various forms of combined amplitude and phase modulation (APSK).

The invention utilizes two dimensional decision feedback that simplifies the output signal set for detection. The invention eliminates the need to have detection capability at each level of a complex, complete output set. Instead, the two dimensional signal produced after the feedback can be detected as a reduced output signal set which is a scaled down version of the original input signal set.

In one particularly desirable aspect of the invention for multilevel PSK modulation, the reduced output signal set has the same number of points and the same distribution array pattern as the input signal set prior to partial response filtering. This enables the reduced output signal set to be detected by a conventional input signal set detector.

DESCRIPTION OF PRIOR ART (a) Single Baseband Channel Partial Response

Many forms and variations of partial response techniques are possible, "Partial Response Signaling" by P. Kabal and S. Pasupathy, *IEEE Transactions on Communications*, September 1975, pp. 921–934. The most common type is a class one, 1+D partial response system. The 1+D partial response system purposely creates intersymbol interference to the point that a single pulse is spready equally across two adjacent signal intervals. The output samples represent the superposition of the present pulse response and the overlapping response of the previous pulse, i.e. half of the previous pulse plus half of the present pulse. Thus, an output sample at $Y_k$ can be expressed as $$Y_k = \tfrac{1}{2}X_{k-1} + \tfrac{1}{2}X_k.\qquad \text{Equation 1}$$

$\tfrac{1}{2}X_{k-1}$ and $\tfrac{1}{2}X_k$ are the individual contributions at sample time k for past and present inputs, respectively.

For a binary signal input which can assume the values of $+1$ or $-1$, the contribution from each individual pulse can assume values of $+\tfrac{1}{2}$ or $-\tfrac{1}{2}$, and the superposed outputs can assume values of $+1, 0, -1$. Hence, a three level output PRS system results. Similarly, for a four level input signal which can assume the values of $+3, +1, -1, -3$, the contribution from each individual pulse can assume values of $+3/2, +\tfrac{1}{2}, -\tfrac{1}{2}, -3/2$, and the superposed output can assume values of $+3, +2, +1, 0, -1, -2, -3$. Hence, a seven level output PRS system results.

Figure 1:
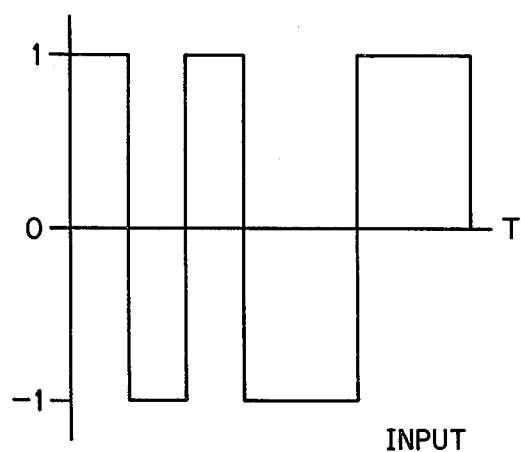
FIG. 1 is a signal level diagram illustrating a two level input for a single channel.
Figure 3:
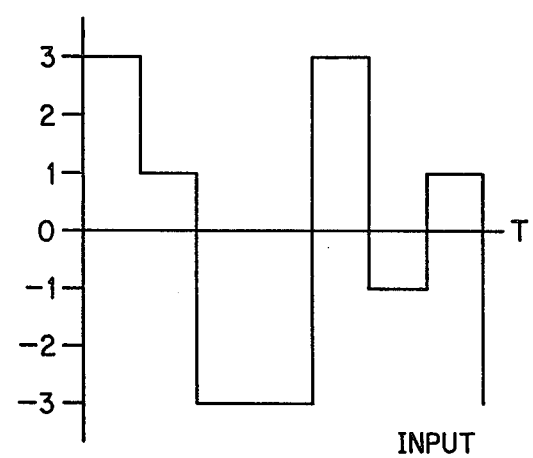
FIG. 3 shows a four level input for a single channel.
Figure 2:
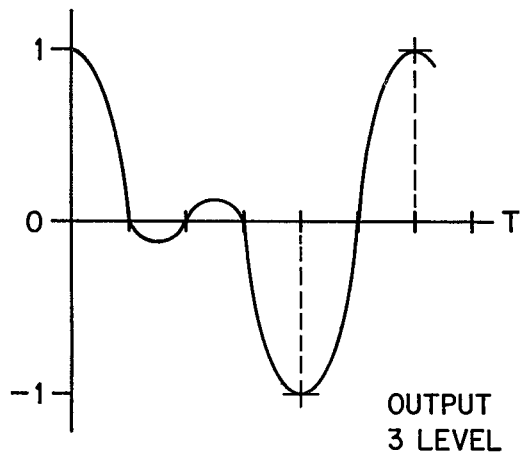
FIG. 2 shows the three level signal output when the two level input of FIG. 1 is a partial response filtered.
Figure 4:
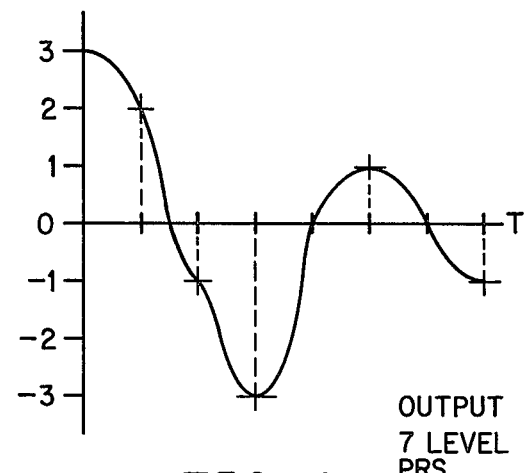
FIG. 4 shows the seven level output when the four level input of FIG. 3 is partial response filtered.

FIG. 1 shows a two level input and FIG. 2 shows the correspondent three level PRS output. FIG. 3 shows a four level input and FIG. 4 shows the correspondent seven level PRS output. The x-axis in FIGS. 1-4 is for time, as indicated by the label T.

Determination of the individual input values (and the corresponding data) can be accomplished by sampling the multilevel output. This is complicated by the fact that some output values can be produced by more than one input sequence. For example, a zero level output is produced by a $+\tfrac{1}{2}$ then $-\tfrac{1}{2}$ input sequence, or by a $-\tfrac{1}{2}$ then $+\tfrac{1}{2}$ input sequence. One way of resolving this ambiguity is to use a precoding scheme which modifies the input data stream to allow determination of the original data by direct correspondence to output samples, "The Duobinary Technique for High-Speed Data Transmission" by A. Lender, *IEEE Transactions on Communications and Electronics*, May 1963, pp. 124-218, and "Multilevel Partial-response Signaling" by A. M. Gerrish and R. D. Howson, *International Conference on Communications Record* (IEEE) 1967, p. 186.

Figure 5:
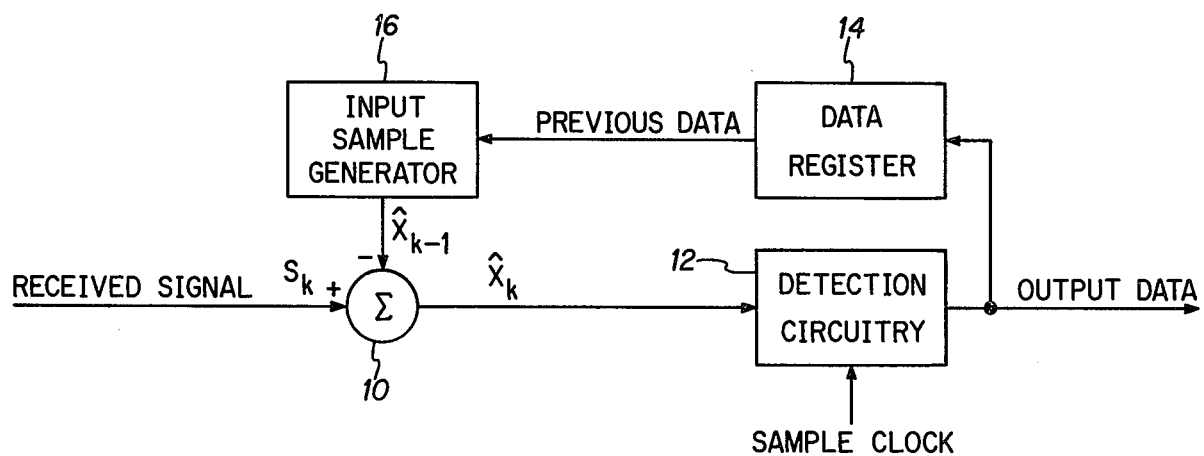
FIG. 5 schematically illustrates known decision feedback detection of a single baseband channel.

A second approach in resolving the noted ambiguities involves the use of memory in the data receiver to compare present sample values with previous sample values to determine that which is new. FIG. 5 illustrates an implementation of this approach with a decision feedback detector. This received signal is delivered through a summer 10 to detection circuitry 12 which feeds the previous data value back through data register 14 to input sample generator 16. This input sample generator 16 generates an estimate $\hat{X}_{k-1}$ of the overlap of the previous pulse which is subtracted from the incoming signal $S_k$ in summer 10 to produce an estimate $\hat{X}_k$ of the present input. If $\hat{X}_{k-1}$ is correct, $\hat{X}_k$ will be correctly detected as $X_k$ unless noise or distortion causes an error.

A disadvantage of this latter technique is that once an error is made, it tends to produce more errors due to erroneous feedback, causing what is known as error propagation. However, the range of current sample values for $\hat{X}_k$ is limited to the number of input levels. If any other level occurs in a sample of $\hat{X}_k$, it is most likely a result of a previous decision error and can be used to determine the correct input despite an error in the feedback path. For example, in a two-input level system (3 output levels), only values of $+\tfrac{1}{2}$ and $-\tfrac{1}{2}$ should occur for $\hat{X}_k$, but a $+3/2$ output sample results if $X_{k-1}$ and X are both positive $(+1)$ while $\hat{X}_{k-1}$ is incorrectly detected to be negative $(-1)$. The abnormally large sample value not only indicates the correct value for $\hat{X}_k$, but also implies that the redundancy in the waveform can be used to correct the previous error. Maximum likelihood detection using multiple interval decisions can be used to improve the error performance for a given signal-to-noise ratio, G. D. Forney, Jr., "Maximum Likelihood Sequence Estimation of Digital Sequences in the Presence of Intersymbol Interference," *IEEE Transactions on Information Theory*, May 1972, pp. 363-378.

(b) Two Dimensional Signal Representation.

Many forms of digital carrier modulation can be represented as amplitude modulation of two quadrature channels. Among these forms are phase shift keying (PSK), minimum shift keying (MSK), and conventional quadrature amplitude modulation (QAM). The two quadrature channels may be obtained as the sine and cosine functions or components of the incoming signal. As an example, Table 1 lists the phase and quadrature amplitude values for a 4 PSK system.

TABLE 1

| Data Values | Phase Value | I-Channel Amplitude | Q-Channel Amplitude |
|---|---|---|---|
| 00 | 45° | .707 | .707 |
| 01 | 135° | −.707 | .707 |
| 11 | 225° | −.707 | −.707 |
| 10 | 315° | .707 | −.707 |

Figure 6:
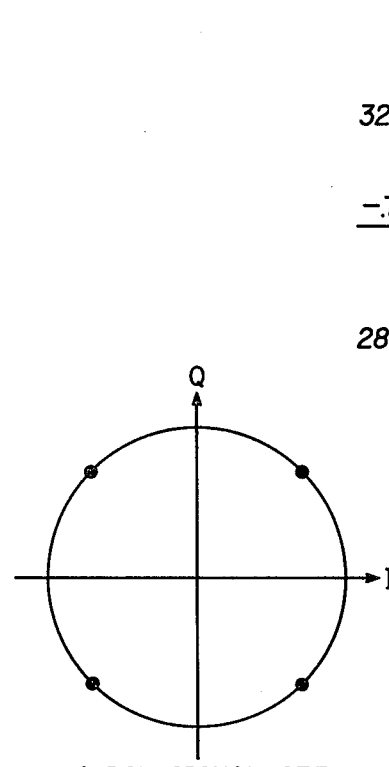
FIG. 6 is a signal state diagram illustrating a 4 PSK input signal set.

FIG. 6 shows the signal state diagram. The I-channel axis represents the cosine component, and the Q-channel axis represents the sine component. It is to be noted that the 4 PSK system is equivalent to a QAM system, FIG. 7, with two input level (0.707 and −0.707) modulation independently applied to each channel.

Table 2 lists the phase and quadrature amplitude values for an 8 PSK system.

TABLE 2

| Data Values ABC | Phase Value | I-Channel Amplitude | Q-Channel Amplitude |
|---|---|---|---|
| 000 | 22.5° | .92 | .38 |
| 001 | 67.5° | .38 | .92 |
| 011 | 112.5° | −.38 | .92 |
| 010 | 157.5° | −.92 | .38 |
| 110 | 202.5° | −.92 | −.38 |
| 111 | 247.5° | −.38 | −.92 |
| 101 | 292.5° | .28 | −.92 |
| 100 | 337.5° | .92 | −.38 |

Figure 8:
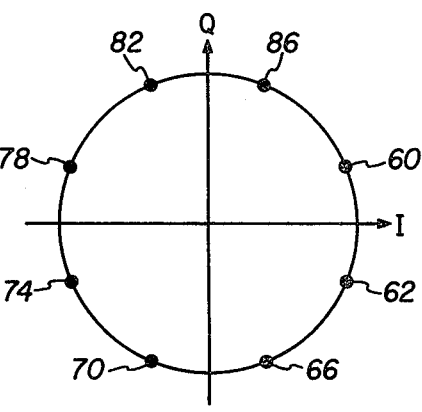
FIG. 8 is a signal state diagram illustrating an 8 PSK input signal set.

FIG. 8 shows the signal state diagram. The amplitude values on each quadrature channel are not independent. Each channel has four amplitude values but only two of the four occur for a given magnitude on the other channel. In a sense, higher level PSK systems are special cases of QAM systems in which the amplitudes on each channel are interdependent.

Figure 7:
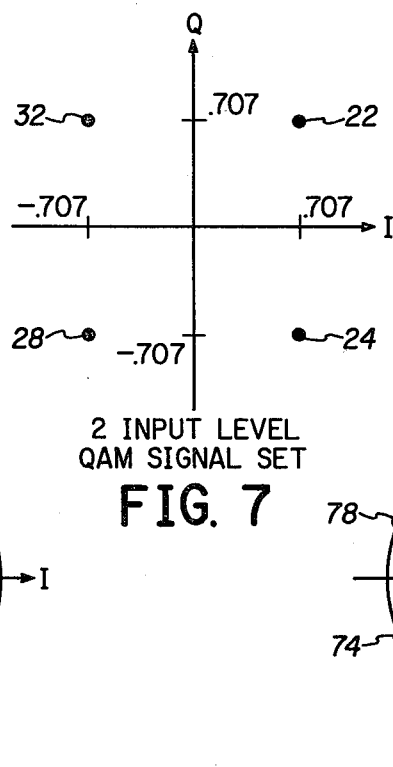
FIG. 7 is a signal state diagram illustrating a two level input QAM signal set.
Figure 9:
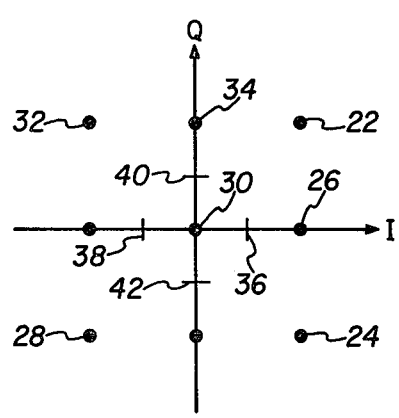
FIG. 9 is a signal state diagram illustrating the 9 point, three level QPRS output signal set generated when the 4 PSK system of FIG. 6 or the two level input QAM system of FIG. 7 is partial response filtered.

If the 4 PSK system of FIG. 6 or the two input level QAM system of FIG. 7 is partial response filtered, a 9 point output signal set is produced as shown in FIG. 9. The signal set of FIG. 9 is obtained from FIG. 6 or 7 by plotting the various combinations of signals according to Equation 1. For example, one-half the value of signal point 22 in FIG. 7 plus one-half the value of signal point 24 results in a value represented by signal point 26, FIG. 9, i.e. a point half-way between points 22 and 24. In like manner, the combination of points 22 and 28 yields point 30. Similarly, with point 22 representing the previous pulse and point 32 representing the present pulse, the combined result is point 34. The remaining permutations of input points 22, 24, 28 and 32 generate the remainder of the 9 point output signal set of FIG. 9. FIG. 9 is also derived from FIG. 6 in like manner.

Despite the increase from four to nine points caused by partial response filtering of the signal set of FIG. 6 or FIG. 7, the data can nevertheless be detected in a straightforward manner by independently decoding the three baseband amplitude levels produced by each quadrature channel. As an example, amplitude detectors may be placed at levels 36 and 38 on the I-channel axis, and amplitude detectors may be placed at levels 40 and 42 on the Q-channel axis. This type of system is usually referred to as a QAM-PRS or QPRS system. For example, FIG. 9 represents a three level QPRS output signal set.

Figure 10:
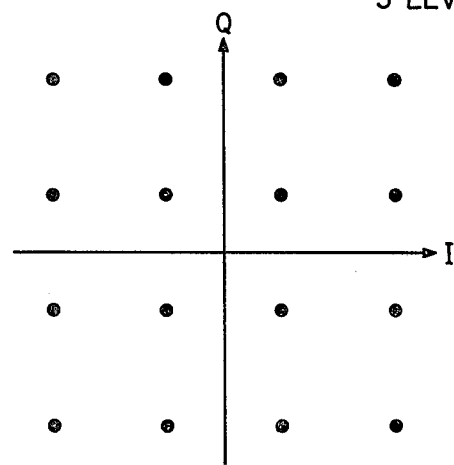
FIG. 10 is a signal state diagram illustrating a four level input QAM signal set.
Figure 11:
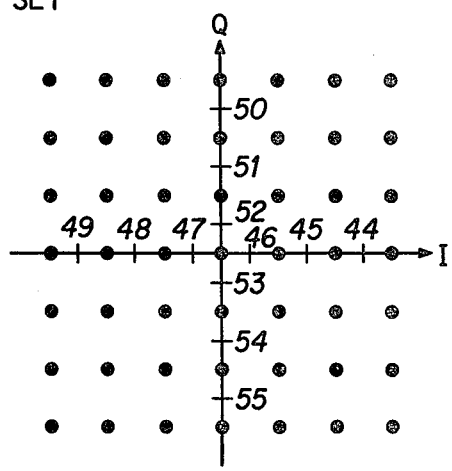
FIG. 11 is a signal state diagram illustrating the 49 point, seven level QPRS output signal set generated when the input signal set of FIG. 10 is partial response filtered.

In like manner as above for the two input level QAM signal set of FIG. 7, a four input level QAM system, FIG. 10, can be partial response filtered to produce two independent seven level PRS channels, as shown by the seven level QPRS output signal set of FIG. 11. Despite the complexity of the 49 point output signal set of FIG. 11, detection is straightforward by means of amplitude detectors at levels 44 through 49 on the I-channel axis, and by amplitude detectors at levels 50 through 55 on the Q-channel axis.

Each of the three level QPRS signal set of FIG. 9 and the seven level QPRS signal set of FIG. 11 can thus be detected in a straightforward manner using separate baseband decoding of the multiple levels on each quadrature channel. Either a precoding or a memory type decision process, FIG. 5, can be implemented for each channel. For example, the memory type decision feedback of FIG. 5 is used on the I-channel, and other memory type decision feedback is implemented on the Q-channel.

Detection of partial response 4 PSK signals is straightforward due to the above noted analogy to a QAM system yielding a QPRS signal set, FIG. 9. Detection of partial response PSK signals with more than four phases is not so straightforward, however. For example, partial response filtering of the 8 PSK input signal set of FIG. 8 generates the complex 8 PSK-PRS output signal set of FIG. 12.

Figure 12:
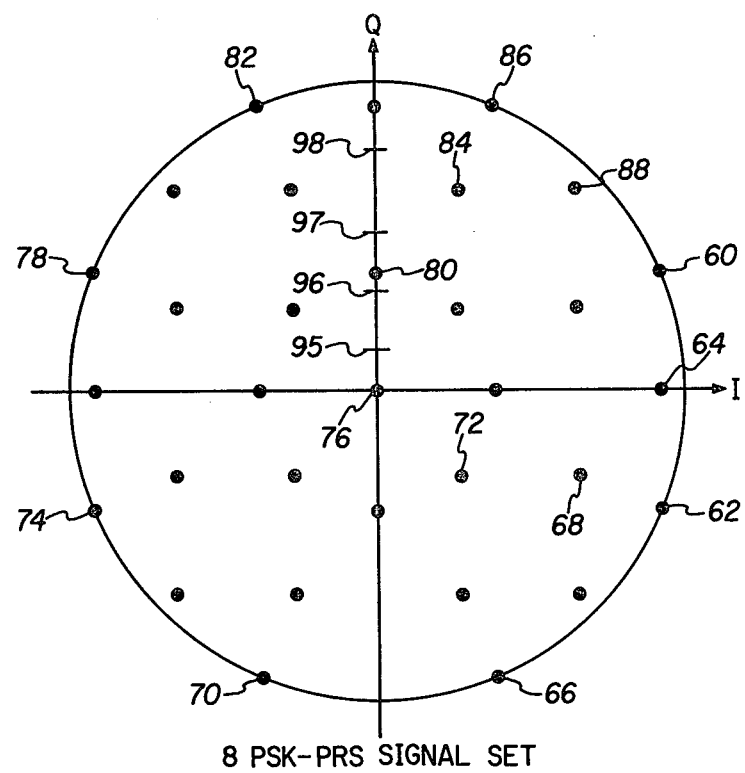
FIG. 12 illustrates the complex amplitude and phase 33 point, 8 PSK–PRS output signal set which is generated upon partial response filtering of the input signal set of FIG. 8.

The 8 PSK-PRS signal set of FIG. 12 is generated as above by determining the various permutations of half-way points between the input signal points of FIG. 8. For example, if point 60, FIG. 8, represents the previous input and point 62 represents the current input, they combine to yield point 64, FIG. 12. In like manner, points 60 and 66 combine to yield half-way point 68; points 60 and 70 yield point 72; points 60 and 74 yield point 76; points 60 and 78 yield point 80; points 60 and 82 yield point 84; and points 60 and 86 yield point 88. The remaining permutations of input signal points result in the remaining points in the matrix of FIG. 12. There are 33 output signal points in the matrix of FIG. 12.

In FIG. 12, the matrix of output signal points represent five different amplitudes (including zero) and sixteen different phases. Furthermore, the projections onto the quadrature axis (or any other axis) do not produce easily separable amplitudes in all cases. For example, using the straightforward amplitude detection above described, detectors would have to be placed at levels 95, 96, 97 and 98, which are extremely close in value. Direct detection of the signal set in FIG. 12 would thus involve significant complexity and/or a loss in performance through the use of suboptimum measurements.

DETAILED DESCRIPTION OF THE INVENTION

Decision Feedback Detection of 8 PSK-PRS Signal Set

The invention provides a simple means of demodulating and detecting 8 PKS-PRS signals. To facilitate ease of understanding, the system is described in terms of absolute phase encoding. The technique works equally well for differential encoding. All that is needed is an absolute phase estimate which can be obtained by accumulating the difference codes. A differential decoder typically uses an arbitrary absolute measure of phase in the process of determining the difference from one interval to the next.

Figure 13:
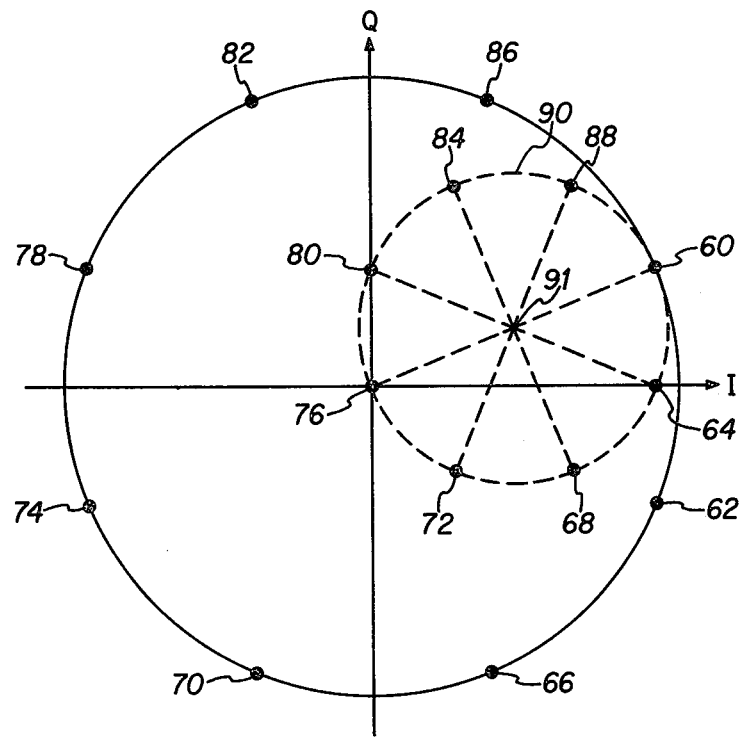
FIG. 13 is a signal state diagram illustrating the reduced, simplified output signal set generated in accordance with the invention for detection of the 8 PSK–PRS output signal set of FIG. 12.

Though the complexity of the signal set in FIG. 12 seems to belie detection in a straightforward or simple manner, the present invention recognizes that the locus of possible signal points for the next sampling interval is merely an eight point constellation centered at a given origin relative to the signal point for the current sampling interval. As shown in FIG. 13, if the signal point for the present sampling interval, is point 60, then the possible output signal points for the next sampling interval, after partial response filtering, are points 88, 84, 80, 76, 72, 68, 64 and 60. These signal points at the next sampling instant are located half the distance toward the full response points. These eight possible signal points lie on a circle or locus 90 centered at an origin 91 at the intersection of 0.46 on the I-channel axis and 0.19 on the Q-channel axis.

The present invention uses two dimensional decision feedback to translate the origin of the incoming quadrature signals to a new origin at 0.46 and 0.19, and applies the resulting signals to a conventional 8-phase decoder/detector. The desired translation for this example, FIG. 13, is obtained by subtracting 0.46 from the I-channel signal and subtracting 0.19 from the Q-channel signal. As seen in FIG. 13, the possible output points for the next sampling interval are merely an 8-point signal set corresponding to a conventional 8 PSK system before partial response filtering, FIG. 8. Thus, after translation of the origin, a conventional 8-phase decoder/detector may be used.

As the incoming signal moves from one signal point to another, the origin translations change. If the proper translations are made, the set of eight signal points received at the next sample time always forms a scaled down version of an 8 PSK constellation. The translations in origin for the next sample time are determined by the phase of the present signal with respect to the current origin. The necessary adjustments ΔI and ΔQ to the received quadrature signals I and Q for each detected phase are listed in Table 3.

TABLE 3

| Previous Phase | Data Values ABC | ΔI | ΔQ |
|---|---|---|---|
| 22.5° | 000 | −.46 | −.19 |
| 67.5° | 001 | −.19 | −.46 |
| 112.5° | 011 | .19 | −.46 |
| 157.5° | 010 | .46 | −.19 |
| 202.5° | 110 | .46 | .19 |
| 247.5° | 111 | .19 | .46 |
| 292.5° | 101 | −.19 | .46 |
| 337.5° | 100 | −.46 | .19 |

Figure 14:
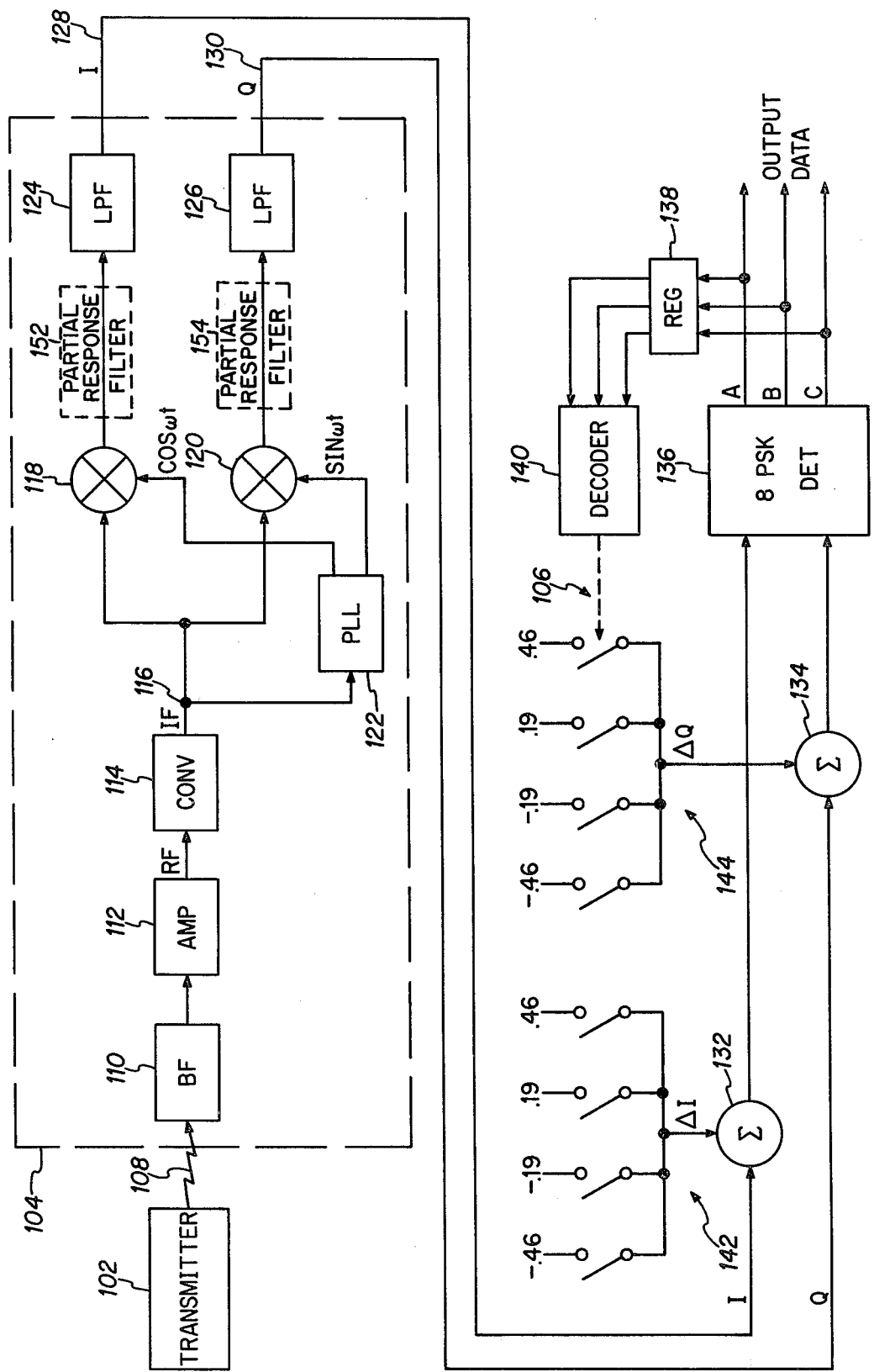
FIG. 14 is a schematic circuit diagram illustrating implementation of the invention.

FIG. 14 shows the invention implemented in a radio application, including a transmitter 102, a receiver 104 and PSK-PRS two-channel decision feedback circuitry 106 for performing the requisite transitions of reduced output signal set 90. Transmitter 102 and receiver 104 are known in the art and form no part of the invention. The received RF signal 108 from the transmitter is passed through a front end or bandpass filter 110 and amplifier 112 to a frequency mixer or down converter 114 to yield an IF signal 116. This signal is delivered to a pair of parallel mixers 118 and 120. The signal is also delivered to a carrier recovery circuit such as a phase locked loop 122 and its associated circuitry which outputs quadrature components cos ωT and sin ωT to mixers 118 and 120, respectively. The mixers multiply the IF signal by the respective cosine or sine function and output the result through a respective low pass filter 124 and 126 as the I and Q channels on lines 128 and 130, respectively.

Lines 128 and 130 deliver the I and Q quadrature signal components to summers 132 and 134 of circuitry 106. The outputs of the summers are delivered to a conventional 8 PSK signal set detector 136. This is a standard detector commonly used in commercially available equipment for detection of the signal set shown in FIG. 8, for example C. R. Hogge, Jr., "Carrier and Clock Recovery for 8 PSK Synchronous Demodulation," *IEEE Transactions on Communications*, Vol. Com-26, No. 5, May 1978, pp. 528–533. This detector 136 has a three-bit output, with the first bit designated A, the second bit designated B, and the third bit designated C. The output data provided by the various combinations of these three bits define the eight points in the signal set in FIG. 8. The three bits are also delivered through a register 138 to switch decode logic or decoder 140. Decoder 140 decodes or maps the various bit combinations into predetermined origin translations for the next sample interval. These origin translation values are fed back to a set of switches 142 and 144 for each channel to select the desired adjustments as designated in Table 4.

TABLE 4

| ΔI = | .46  | when $\overline{BC}$ = 1 |
| --- | --- | --- |
| =    | −.46 | when $B\overline{C}$ = 1 |
| =    | .19  | when $\overline{B}C$ = 1 |
| =    | −.19 | when BC = 1 |
| ΔQ = | .46  | when $\overline{AC}$ = 1 |
| =    | −.46 | when $A\overline{C}$ = 1 |
| =    | .19  | when $\overline{A}C$ = 1 |
| =    | −.19 | when AC = 1 |

Switch set 142 has four possible voltages to be selected from, each causing the indicated value to be added in summer 132 to the incoming signal on the I channel. Switch set 144 is comparable for the Q channel.

The adjustments ΔI and ΔQ translate the origin of reduced signal set 90, FIG. 13, in accordance with the immediately previously detected signal. For example, for signal point 60 in FIG. 13, the I channel has an amplitude value of 0.92 and the Q channel has an amplitude value of 0.38, Table 2, which is detected by detector 136 as a phase value of 22.5°. Phase detector 136 thus outputs a three-bit code of 000. Decoder 140 responds to this particular code value combination by selecting the ΔI and ΔQ adjustments shown in Tables 3 and 4, whereby a ΔI value of −0.46 is added to the I channel value in the next signal interval, and a ΔQ value −0.19 is added to the Q channel value in the next signal interval. This cycle is repeated as detector 136 detects the new resultant I and Q values corresponding to one of the eight phase points of the reduced signal set.

The partial response filtering may be provided at various places in the system, and may be performed in fractional segments at a plurality of places in the system, all as is well known in the art. As an example, all of the partial response filtering may be done at a single location in the system such as by filters 152 and 154 at the output of mixers 118 and 120. As another example, some of the partial response filtering may be done in transmitter 102 and the remainder somewhere in receiver 104.

ERROR PROPAGATION

A disadvantage of decision feedback detectors is the error propagation caused thereby. Once an error is made, its effects are contained in the feedback path and tend to produce more errors. However, when errors in the feedback signal occur, their presence is usually indicated by incoming signal levels or sequences that cannot occur without an abnormality of some kind.

For example, a signal error in the 8 PSK–PRS quadrature channel decision feedback circuitry 106 of FIG. 14 causes the wrong translation of the origin of reduced signal set 90, FIG. 13, to occur for the next sample time. The result is that the adjusted quadrature channel signal will most likely not represent a signal of exactly half the amplitude of the full response signal set consisting of points 60, 62, 66, 70, 74, 78, 82 and 86, FIGS. 8 and 13. If the abnormal amplitude is detected, this knowledge can be used not only to remove the error in the feedback signal, but also to correct the previous decision error using maximum likelihood techniques, G. D. Forney, Jr. "Maximum Likelihood Sequence Estimation of Digital Sequences in the Presence of Intersymbol Interference," *IEEE Transactions on Information Theory*, May 1972, pp. 363–378.

A particularly desirable feature of the invention is that it is automatically self-corrective. In lieu of monitoring the phasor amplitudes of the modified quadrature signals, errors in the 8 PSK feedback can be removed by simply making the phase measurements and operating as though no errors exist. Eventually, the system automatically makes the correct decision despite the existence of an error in the feedback path, as will now be explained.

Figure 15:
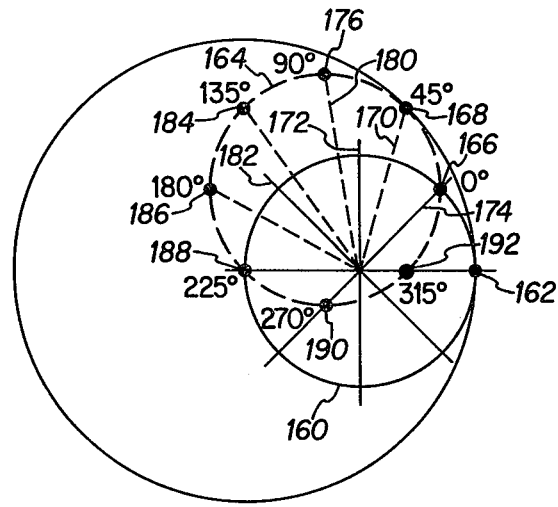
FIGS. 15 through 18 are phase error diagrams illustrating various phase errors between the feedback detection signal set and the actual signal set.

FIG. 15 shows a reduced signal set 160 comparable to signal set 90 of FIG. 13 but turned clockwise by 22.5 degrees such that point 162, which corresponds to point 60 of FIG. 13, is on the I-channel axis. This change of orientation is merely to facilitate ease of understanding of the following description.

Locus 160 represents the signal set detected by detector 136 and presented in the feedback circuitry, FIG. 14. FIG. 15 shows this detected signal set 160 as 45 degrees away from the actual or correct signal set 164 as shown in dashed line. There is thus a 45 degree phase error between the actual locus of possible signal points 164 and the detection feedback locus 160.

If point 166 is the next received signal point, then the detection circuitry will indicate a phase of 45 degrees for this point because that is where point 166 occurs relative to the origin of locus 160. The actual phase of point 166 is 0 degrees, relative to the origin of correct locus 164.

If point 168 is the next signal, the detection circuitry will indicate a phase of 90 degrees, not the correct value of 45 degrees. This 90 degree indication results because projection 170 is closer to the 90 degree gradation 172 of locus 160 than to the 45 degree gradation 174 of locus 160.

If point 176 is the next signal, then the detection circuitry will indicate a phase of 90 degrees relative to locus 160 because projection 180 is closer to 90 degree gradation 172 than to 135 degree gradation 182. Thus, even though there is a 45 degree phase error between signal set 160 and signal set 164, signal point 176 yields the same indicated phase for both, whereby to yield correct phase detection even though there is an error in the feedback path. Signal point 184 likewise yields the same phase indicator for both signal sets 160 and 164, namely 135 degrees.

Signal point 186 yields an indicated phase of 135 degrees (relative to locus 160) instead of the correct value of 180 degrees (relative to locus 164). Signal point 188 yields an indicated phase of 180 degrees instead of the correct value of 225 degrees. Signal point 190 yields an indicated phase of 225 degrees instead of the correct value of 270 degrees. Signal point 192 yields an indicated phase of 0 degrees instead of the correct phase of 315 degrees.

As seen in FIG. 15, two of the possible eight signal points still yield a correct phase indication even though there is a 45 degree phase error between the feedback signal set 160 and the actual signal set 164. Signal points 176 and 184 yield the correct phase indication. The remaining six signal points 186, 188, 190, 192, 166 and 168 yield incorrect phase indications. These incorrect phase indications, however, are not greater than 45 degrees off, and hence the phase differential error is not expanded. On the contrary, for the next occurring signal point there is again a one-fourth chance that the correct phase will be indicated and thus resynchronize the system and eliminate the error. Statistically then, the system will eventually automatically resynchronize itself.

Figure 16:
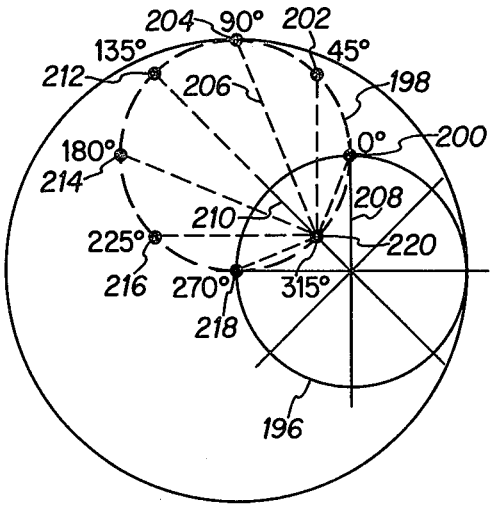

FIG. 16 shows a 90 degree phase error between the detection feedback signal set 196 and the actual signal set 198. Signal point 200 yields a phase indication of 90 degrees (relative to locus 196) instead of the correct value of 0 degrees (relative to locus 198). Signal point 202 yields a phase indication of 90 degrees instead of the correct value of 45 degrees. Signal point 204 has about a 50 percent chance of yielding the correct phase indication. This is because projection 206 is about halfway between the 90 degree gradation 208 of locus 196 and the 135 degree gradation 210 of locus 196. If point 204 is read by locus 196 as having a phase 206 closer to gradation 208, then a 90 degree phase is indicated, which is the correct phase of point 204.

Signal point 212 yields a phase indication of 135 degrees which is correct. Signal point 214 most likely yields a phase indication of 135 degrees instead of the correct value of 180 degrees. Signal point 216 yields a phase indication of 180 degrees instead of the correct value of 225 degrees. Signal point 218 yields a phase indication of 180 degrees instead of the correct value of 270 degrees. Signal point 220 yields a phase indication of 135 degrees instead of the correct value of 315 degrees.

In FIG. 16, it is thus seen that there is about a 1 and ½ out of 8 chance that the indicated signal phase for the next signal point will be correct even though there is a 90 degree error between the feedback signal set 196 and the actual signal set 198. Signal point 212 yields the same phase indication (135 degrees) for both locus 196 and locus 198. The occurrence of signal point 212 as the next signal point thus will resynchronize the system and eliminate the feedback error. If signal point 204 occurs next then the system has a 50 percent change of resynchronizing. If any of the remaining signal points occur as the next sample point, then an incorrect phase is indicated. Except for point 220, the phase error either remains at 90 degrees or is reduced to 45 degrees. If the phase error is reduced to 45 degrees, then the probability of resynchronization for the next sample point thereafter is 2 out of 8 as in FIG. 15.

Figure 17:
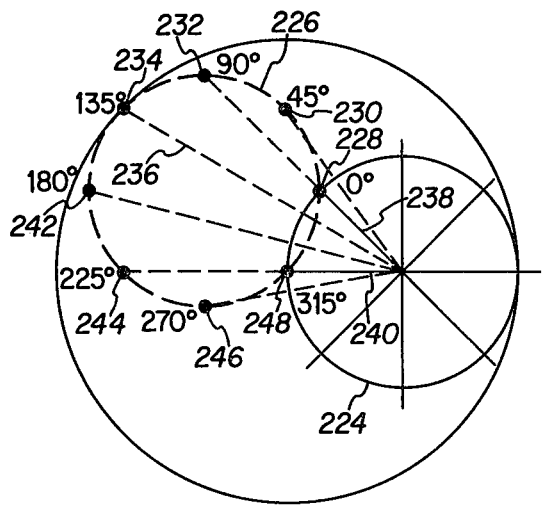

FIG. 17 shows a 135 degree phase error between the feedback signal set 224 and the actual signal set 226. Signal point 228 yields a phase indication of 135 degrees instead of the correct value of 0 degrees. Signal point 230 most likely yields a phase indication of 135 degrees instead of the correct value of 45 degrees. Signal point 232 yields a phase indication of 135 degrees instead of the correct value of 90 degrees. Signal point 234 will likely yield a phase indication of 135 degrees which is correct. Projection 236 is closer to 135 degrees gradation 238 of locus 224 than to 180 degree gradation 240 of locus 224 and thus should generate the 135 degree indication. Signal point 242 will likely yield a phase indication of 180 degrees which is correct. Signal point 244 yields a phase indication of 180 degrees instead of the correct value of 225 degrees. Signal point 246 yields a phase indication of 180 degrees instead of the correct value of 270 degrees. Signal point 248 yields a phase indication of 180 degrees instead of the correct value of 315 degrees. It is thus seen that two of the possible eight signal points will likely yield a correct phase indication notwithstanding the feedback error.

Figure 18:
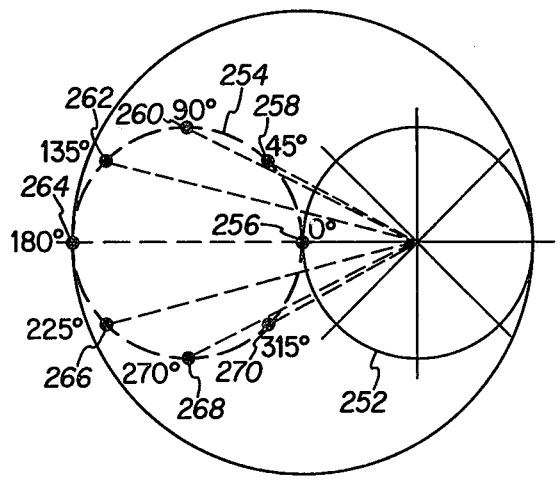

FIG. 18 shows a detection feedback signal set 252 which is 180 degrees out of phase with the actual signal set 254. Signal point 256 yields a phase indication of 180 degrees instead of the correct value of 0 degrees. Signal point 258 yields a phase indication of 135 degrees instead of the correct value of 45 degrees. Signal point 260 yields a phase indication of 135 degrees instead of the correct value of 90 degrees. Signal point 262 most likely yields a phase indication of 180 degrees instead of the correct value of 135 degrees. Signal point 264 yields a phase indication of 180 degrees which is correct. Signal point 266 likely yields a phase indication of 180 degrees instead of the correct value of 225 degrees. Signal point 268 likely yields a phase indication of 225 degrees instead of the correct value of 270 degrees. Signal point 270 likely yields a phase indication of 225 degrees instead of the correct value of 315 degrees. It is thus seen that there is a 1 out of 8 chance that the correct phase will be indicated notwithstanding the feedback error.

The present invention thus affords a practical system. The system would not be practical if feedback error were not corrected because such error would merely multiply itself. The present invention affords a system which is self-correcting and automatically resynchronizes with statistical probability.

GENERAL 2-CHANNEL DECISION FEEDBACK

The above-described 2-channel decision feedback system for an 8 PSK–PRS signal set can be extended to detect any form of amplitude and phase modulation (APSK) that has undergone any type of partial response filtering, including correlative encoding. Regarding the particular type of partial response filtering called correlative encoding, reference is made to A. Lender, "Correlative Level Coding for Binary-Data Transmission," *IEEE Spectrum*, February, 1966, pp. 104–109. In general, the output of a partial response system with a quadrature channel input signal can be represented by:

$$\overline{S}_k = \sum_{i=0}^{N-1} \alpha_i \overline{E}_{k-i} \quad \text{Equation 2}$$

here:
- k is the current sample time of the channel output;
- $\overline{S}_k$ is a vector representing both the I and Q channel outputs;
- N is the number of signal intervals over which an input pulse is spread by the partial response filter or correlative encoding;
- $\alpha_i$ is the residual response of a unit amplitude pulse applied i signal intervals earlier; and
- $\overline{E}_{k-i}$ is the amplitude vector to the I and Q channels i intervals before the present sample time k.

Equation 2 represents the superposition of pulse response on each of the quadrature channels. With conventional QAM modulation the amplitude values on the I and Q channels are independent. In PSK and APSK systems, however, the amplitudes are not independent. In 1+D partial response systems, N=2, $\alpha_0 = \frac{1}{2}$, $\alpha_1 = \frac{1}{2}$, and the other $\alpha = 0$. For 8 PSK systems, the $\overline{E}_k$ are selected from the rows of Table 2.

Using decision feedback to remove the effects of previous input pulses produces a modified output $\overline{S}'_k$ according to $$\overline{S}'_k = \overline{S}_k - \sum_{i=1}^{N-1} \alpha_i \overline{E}_{k-i} \quad \text{Equation 3}$$

$$= \alpha_o \overline{E}_k$$

Thus, after subtracting the effects of all previous pulses, all that remains is a scaled-down version of the input vector. The feedback of each $\alpha_i \overline{E}_{k-i}$ is delayed by iT, where T equals one signaling interval.

Figure 19:
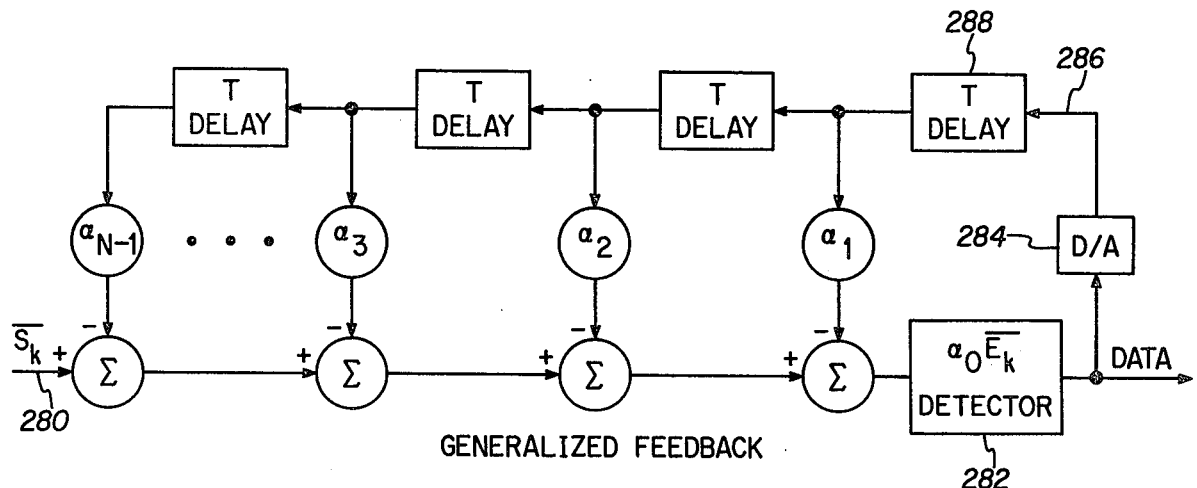
FIG. 19 illustrates a generalized feedback structure constructed in accordance with the invention.

FIG. 19 shows a generalized feedback structure for implementing Equation 3. The system in FIG. 19 is comparable to the system in FIG. 14, but is an extension thereof in that the feedback of a particular vector may last for more than one signal interval. The input signal 280 is vector $\overline{S}_k$ representing both the I and Q channels and is delivered to detector 282. The output of detector 282 is fed back through a D/A converter 284 comparable to the composite of components 138, 140, 142 and 144, FIG. 14. The decoded mapped translations, $\Delta I$ and $\Delta Q$, are delivered on output 286 to a plurality of serial delay units such as 288 each providing a delay of one signaling interval T such that $\alpha_1$ removes the overlap from the immediately preceding pulse, $\alpha_2$ removes the overlap from the pulse before that, and so on.

APSK-PRS SIGNAL SET

Figure 20:
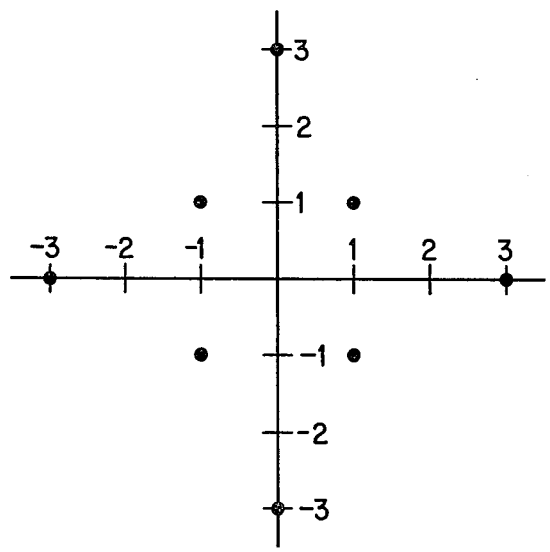
FIG. 20 is a signal state diagram illustrating an 8 point APSK input signal set, with eight phases and with four input levels on each channel.
Figure 21:
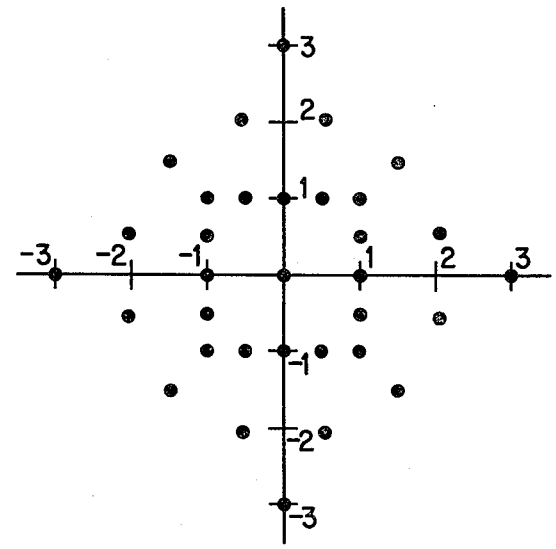
FIG. 21 is a signal state diagram illustrating the output signal set generated upon partial response filtering of the input signal set of FIG. 20.
Figure 22:
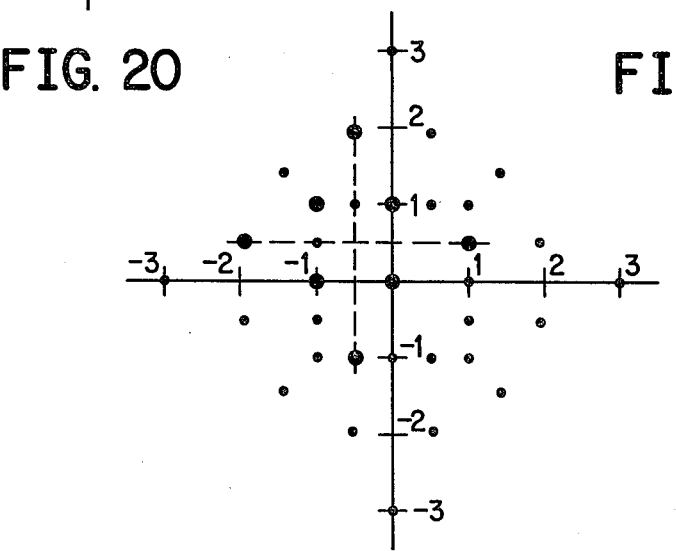
FIG. 22 is a signal state diagram illustrating the reduced output signal set generated in accordance with the invention for detection of the output signal set of FIG. 21.

FIGS. 20 through 22 illustrate application of the invention in a modulation system which is both amplitude and phase shift keyed (APSK). FIG. 20 illustrates the signal set state diagram for an APSK signal set with eight phases, and with four different amplitude levels for each channel. Partial response filtering of the 8 point signal set of FIG. 20 yields the 33 point signal set of FIG. 21. Two dimensional decision feedback in accordance with the invention produces a reduced set of possible next interval signal points, represented by large dots in FIG. 22, which is a scaled down version of the original full response signal set before partial response filtering, FIG. 20. In the example of FIG. 22, the previous signal was at (−1, 1). The center of the resulting reduced set is (−0.5, 0.5); thus (−0.5, 0.5) must be subtracted by the feedback circuitry to translate the locus of possible signal points for the next interval to the origin of the coordinates. This locus may be detected by a conventional APSK detector such as used for detection of the signal set of FIG. 20.

It is generally understood by the majority of those skilled in the art that partial response filtering is generic to correlative encoding, and this is the meaning used in the appended claims. Correlative encoding typically involves signal overlap and superposition at the signal source, and is a special case or species included in the generic term partial response filtering. The last mentioned Lender article is noted for further reference regarding correlative encoding. The invention covers the many various types of partial response filtering, including correlative encoding.

It is recognized that various modifications are possible within the scope of the appended claims.

I claim:

1. A method of processing output signals which result from quadrature channel partial response filtering of input signals, there being a complete set of possible output signals corresponding to a particular set of input signals, all of said signals having a pulse interval associated therewith, the method comprising:
   detecing modified output signals in a detection set comparable to said input signal set and generating estimates of input signals based on the modified output signals detected, and
   modifying said system output signals so that the set of modified system output signals which are possible in the next interval is a translated subset of said complete set and conforms to said detection set,
   thereby deriving estimates of said input signals from said system output signals.

2. The invention according to claim 1 wherein said subset has the same number of points and same distribution array pattern as said input signal set.

3. The method of claim 1, wherein said system output signals are modified based on at least one input signal estimate from the current and preceding intervals.

4. The invention according to claim 3 wherein said signal subset includes the signal point of the current interval and the locus of possible partial response output signal points for the next interval.

5. The invention according to claim 1 comprising generating said signal subset by quadrature decision feedback subtracting of any contributions to the signal of the current interval arising from signals in previous intervals due to partial response filtering, and wherein said signal subset is translated to a constant position within said output signal set.

6. In a quadrature channel partial response system having a set of input signals and having output signals giving rise to a complete output signal set and including means for detecting only a subset of said complete set, the improvement comprising quadrature interdependent channel decision feedback means, responsive to the detecting means, for selecting changes to be made in the output signals; and means, responsive to the selected changes and to the output signals, for generating a translated subset of the complete output set as an input for said detecting means.

7. The invention according to claim 6 wherein said generated output signal subset has the values, scaled down, of the input signal set, and said selecting and generating means provide determined translations of said signal subset within said complete output signal set.

8. The invention according to claim 7 wherein said detecting means provides input signal estimates associated with sample times, and said selecting and generating means provide said translations for each sample time, determined by the value of at least one input signal estimate of previous sample times.

9. The invention according to claim 6 wherein said generated output signal subset has the same number of points as the input signal set.

10. The invention according to claim 9 wherein said translated output signal subset has the same distribution array pattern as said input signal set, whereby said means for detecting can comprise means for detecting the input signal set.

11. Apparatus for use with a system in which quadrature channel input signals are partial response filtered to provide output signals, there being a complete set of possible output signals corresponding to a particular set of input signals, all of said signals having a pulse interval associated therewith, the apparatus comprising:
means for detecting modified output signals in a detection set comparable to said input signal set and generating estimates of input signals based on the modified signals detected, and
means responsive to at least one input signal estimate from the current and preceding intervals, for modifying said system output signals so that the set of modified system output signals which are possible in the next interval is a translated subset of said complete set and conforms to said detection set, forming an input to said means for detecting,
thereby deriving estimates of said input signals from said system output signals.

12. The apparatus of claim 11, wherein said system output signals are modified so as to remove the residual response in the next interval due to input signals associated with the current and preceding intervals.

13. In a PSK or an APSK partial response filter system generating an output $\overline{S}_k$ represented by $$\overline{S}_k = \sum_{i=0}^{N-1} \alpha_i \overline{E}_{k-i}$$

where:
K is the current sample time of the channel output;
$\overline{S}_k$ is a vector representing both I and Q channel outputs;
N is the number of signal intervals over which an input pulse is spread by the partial response filter;
$\alpha_i$ is the residual response of a unit amplitude pulse applied i signal intervals earlier; and
$\overline{E}_{k-i}$ is the input amplitude vector applied to the I and Q channels i intervals before the present sample time k,
an improvement for obtaining estimates $\hat{\overline{E}}_k$ of input vector values $\overline{E}_k$, comprising:
detector means for generating said estimates $\hat{\overline{E}}_k$ from a modified output vector $\overline{S}'_k$ by detecting the components of a vector $\alpha_o \overline{E}_k$, where $\alpha_o$ is a scale factor, and
means, including quadrature interdependent channel decision feedback, responsive to said output vector $\overline{S}_k$ and said estimates $\hat{\overline{E}}_k$, for generating said modified output $\overline{S}'_k$ according to:

$$\overline{S}'_k = \overline{S}_k - \sum_{i=1}^{N-1} \alpha_i \overline{E}_{k-i}.$$

14. The invention according to claim 13 comprising delaying the feedback of each $\alpha_i \hat{\overline{E}}_{k-i}$ by iT where T equals one signaling interval.

15. The method of claim 1, wherein the values of the signal points in said subset are scaled down compared to signal points of said input signal set.

* * * * *